July 19, 1938.                I. L. ARB                2,124,241
                            POURING SPOUT
                         Filed Oct. 25, 1937

Inventor

Irvin Lemuel Arb

By Clarence A. O'Brien
   Hyman Berman
                        Attorneys

Patented July 19, 1938

2,124,241

UNITED STATES PATENT OFFICE 2,124,241

POURING SPOUT

Irvin L. Arb, Adrian, Tex.

Application October 25, 1937, Serial No. 170,930

3 Claims. (Cl. 221—27)

The present invention relates to pouring spouts for containers and has for its primary object to provide a device of this character carried by the lid of the container and adapted for movement into and out of pouring position through an opening in the container.

A further object is to provide a device of this character of simple and practical construction, efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof wherein like numerals refer to like parts throughout and in which:

Figure 1:
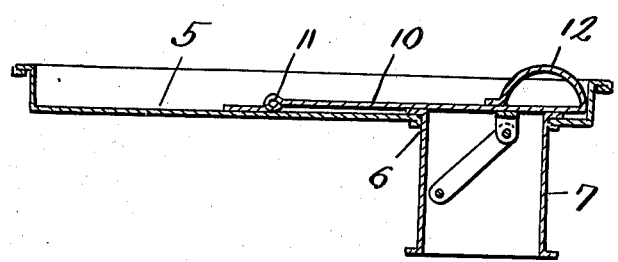
Figure 1 is a sectional view through a lid of a container showing the pouring spout in retracted position therein.

Referring now to the drawing in detail, wherein for the purpose of illustration I have disclosed a preferred embodiment of the invention, the numeral 5 designates a lid adapted for positioning over the open end of a container, said lid having an opening 6 therein within which is slidably positioned a spout 7 of tubular formation, said spout having upper and lower flanges 8 and 9, respectively, to prevent removal of the spout from the lid.

A combined cover and manipulating member for the spout, designated at 10, is hingedly connected at one end as at 11 to the top of the lid while the opposite free end of the plate 10 is rolled upwardly and rearwardly to form a finger grip 12. To the underside of the plate 10 is secured a bracket 13 of U-shaped formation having a rod 14 pivoted to the legs 15 of said bracket, each end of said rod having links 16 pivoted thereto and extending downwardly into the spout 7 and pivotally attached to the inner wall of the spout by a pin 17.

Figure 2:
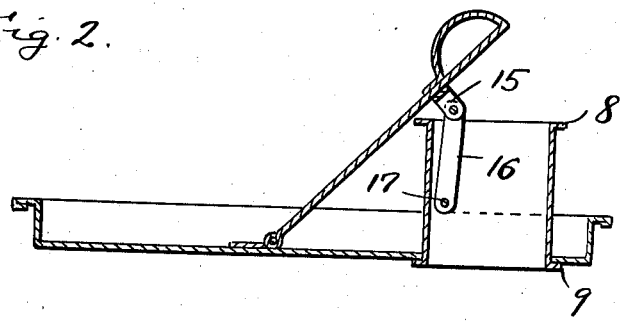
Figure 2 is a similar view showing the spout in projected position ready for use.
Figure 3:
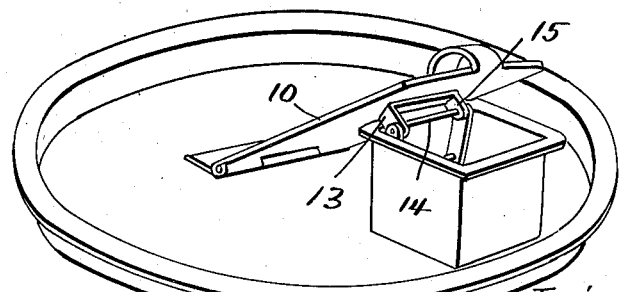
Figure 3 is a perspective view thereof.

From the foregoing description it will be apparent that upon the raising of the plate 10 by the finger grip 12 the spout 7 will be moved upwardly through the opening of the lid from the position shown in Figure 1 to that shown in Figure 2, whereupon the contents of the container upon which the lid is mounted may be poured through the spout 7.

It is believed the details of construction and operation will be readily apparent from the foregoing without further detailed explanation.

Having thus described the invention what I claim is:—

1. A pouring spout comprising in combination a lid having an opening therein, a spout mounted for sliding movement through said opening and a combined cover and manipulating plate for said spout, said plate being hingedly connected at one end to the central portion of the lid and having its free end adapted to lie flatly upon the lid in overlying relation with respect to the outer end of the spout and means connecting said plate to said spout.

2. A pouring spout comprising in combination a lid having an opening therein, a spout mounted for sliding movement through said opening and a combined cover and manipulating plate for said spout, said plate being hingedly connected at one end to the central portion of the lid and having its free end adapted to lie flatly upon the lid in overlying relation with respect to the outer end of the spout and means connecting said plate to said spout, said means comprising a bracket secured to the underside of the plate and a link having one end pivotally connected to said bracket and its opposite end pivotally connected to said spout.

3. A pouring spout comprising in combination a lid having an opening therein, a spout slidably mounted in said opening, a plate member hingedly connected at one end to said lid adjacent its central portion and having its free end disposed in overlying relation with respect to the outer end of the spout the free end of the plate having a portion bent upwardly and inwardly to form a finger grip and means pivotally connecting the plate to said spout.

IRVIN L. ARB.